United States Patent [19]
Peterson

[11] 3,889,158
[45] June 10, 1975

[54] SERIES CAPACITOR PROTECTION EQUIPMENT WITH DUAL SPARKOVER FEATURE

[75] Inventor: Charles A. Peterson, Bloomington, Ind.

[73] Assignee: Westinghouse Electric Corporation, Pittsburgh, Pa.

[22] Filed: Aug. 27, 1974

[21] Appl. No.: 500,996

[52] U.S. Cl. .................................. 317/12 A; 317/16
[51] Int. Cl. ............................................. H02h 7/16
[58] Field of Search ........ 317/12 A, 12 B, 12 R, 16, 317/36 TD

[56] References Cited
UNITED STATES PATENTS

| | | | |
|---|---|---|---|
| 3,249,813 | 5/1966 | Price et al. | 317/12 A |
| 3,586,909 | 6/1971 | Thorsteinsen et al. | 317/12 A |

Primary Examiner—James D. Trammell
Attorney, Agent, or Firm—G. H. Telfer

[57] ABSTRACT

Multiple bypass circuit branches are provided across the equipment to be protected and have different sensitivity to overvoltages. Upon sparkover of the apparatus the most sensitive circuit branch is disabled for a time, as by opening a switch in that branch by reason of signals initiated upon breakdown of a subsequent branch. After a time interval, the most sensitive circuit branch is again restored to its operable condition, as by operation of a timer and subsequent reclosing of the referred to switch in the first circuit branch. The arrangement permits a low overvoltage protection level and avoids problems upon reinsertion after a line fault is cleared by being insensitive to system swing currents and post reinsertion transient voltages that may exceed the lower sparkover protective level but not reach the higher sparkover protective level.

6 Claims, 1 Drawing Figure

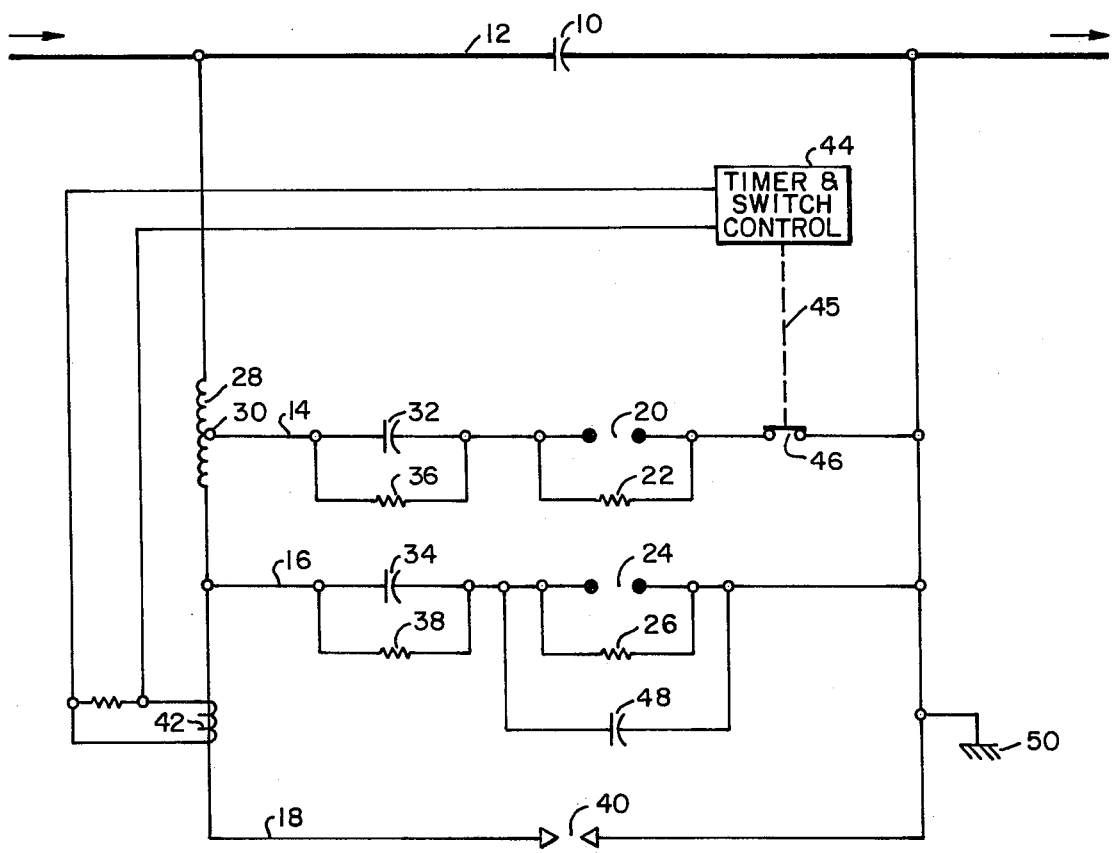

SERIES CAPACITOR PROTECTION EQUIPMENT WITH DUAL SPARKOVER FEATURE

BACKGROUND OF THE INVENTION

The invention relates generally to overvoltage protection equipment for electrical apparatus and particularly to that useful for series capacitor installations in high voltage alternating current transmission lines.

Capacitor banks are connected in series in high voltage transmission lines to compensate a desired part of the inductance of the line in order to raise the stability, control load division between parallel lines, or provide other benefits. Since the capacitors are in series in the line they are subject to dangerous overvoltages in case of a fault on the line or other excess current conditions such as may result from switching surges. Protection against such overvoltages must be substantially instantaneous and for this reason series capacitors are usually protected by spark gaps connected across the capacitor bank or across individual series segments of the bank. The protective gaps arc over and bypass the capacitor substantially instanteously upon the occurrence of a predetermined overvoltage. Systems of this general type are well known and reference is made to the following patents for information with respect to the purpose and utility of such protection systems and their general nature and types of specific components employed therein: Cuttino U.S. Pat. No. 3,335,362, Aug. 8, 1967; Marbury U.S. Pat. No. 3,385,941, May 28, 1968; Grove et al. U.S. Pat. No. 3,801,870, Apr. 2, 1974. Additional background is contained in the referred to patents.

It is desirable to have a protective level on some power systems under some system conditions that is lower than that required for protection of the capacitors. The purpose of the lower protective level is to "detune" the power system between a fault location and the generation station under fault conditions. If the capacitor bank remains on the system, a tuned condition can exist between the system line inductance, the series capacitance of the bank, the system generation station and the fault location. This condition results in an oscillating shock being placed on the rotating shafts of the generation equipment that might cause damage.

If the capacitor bank is removed from the system (by having a lower protective level) an oscillating condition cannot exist. The lower the protective level, the lower is the magnitude of a through fault that will be permitted to pass through the capacitor bank and to lower the oscillating mechanical shock to the rotating shafts.

After the fault or surge has passed, it is desirable to have the capacitor bank back on the line to provide the desired compensation and assist the system in returning to normal operation. Two conditions can occur that can prevent the capacitor bank from returning to service: (1) post-reinsertion transients and (2) system swing currents. The post reinsertion transient overvoltages are voltages caused by the timing of the extinction of the main spark gap that causes returning of the capacitor bank to service in relation to instantaneous voltage and current present on the system. Referred to U.S. Pat. No. 3,801,870 particularly deals with the problem of post reinsertion transients.

The system swing current is a current flow between two or more generating stations, after a fault has been cleared and before the system returns to normal operation. With the capacitor bank in service during swing current conditions, the effect is to reduce the apparent distance between generating stations, electrically tying the generators more solidly together and reducing the swing currents. These two conditions may require a protective level above the earlier mentioned low protective level.

The apparatus of U.S. Pat. No. 3,801,870 can be used to limit the magnitude of post reinsertion transients below the protection level. However, such apparatus does not allow swing currents higher than the chosen protection level.

SUMMARY OF THE INVENTION

In accordance with this invention a "dual sparkover" protection system with multiple bypass circuit branches is provided across the equipment to be protected that are operable to protect against different overvoltage levels or have a different sensitivity to overvoltages. Upon sparkover of the apparatus the most sensitive circuit branch is disabled for a time, as by opening a switch in that branch by reason of signals initiated upon breakdown of a subsequent branch. After a time interval, the most sensitive circuit branch is again restored to its operable condition, as by operation of a timer and subsequent reclosing of the referred to switch in the first circuit branch.

The arrangement permits a low overvoltage level to avoid oscillations that could be harmful to generating equipment and avoids problems upon reinsertion after a line fault is cleared by being insensitive to system swing currents that may exceed the lower sparkover protective level but not reach the higher sparkover protective level of the less sensitive circuit branch.

BRIEF DESCRIPTION OF THE DRAWINGS

The single FIGURE is a circuit schematic of one embodiment of the present invention.

DESCRIPTION OF THE PREFERRED EMBODIMENTS

Referring to the drawing there is shown one phase of a typical series capacitor installation incorporating the present invention wherein a capacitor 10 is connected in series in a high voltage alternating current transmission line 12. It will be understood that the illustrated capacitor 10 can represent a high voltage capacitor bank usually consisting of many individual capacitor units connected in a suitable series-parallel arrangement to obtain the desired capacitive reactance and current capacity. Such banks are frequently divided into a number of series connected segments and the illustrated capacitor 10 is intended to represent such an installation. The term "capacitor" as used herein therefore includes capacitor banks having any number of suitably connected individual capacitor units, or any combination of capacitor units connected together, as well as the individual units themselves. It will also be understood that only one phase is illustrated of what would usually be a three phase line with similar protective equipment and capacitors on each phase. In some cases the apparatus as shown is accompanied by a mirror duplicate taken about the cabinet ground line 50.

Capacitor 10 has connected across it first, second, and third circuit branches 14, 16 and 18 that are electrically in parallel with each other and with capacitor 10. In a first circuit branch there is a means 20 for bypassing the capacitor at a first predetermined overvoltage level. Here the bypassing means 20 is a spark gap (or series of gaps) having a breakdown level adjusted to be as sensitive as desired for protection of the power system against through faults, and is lower than that required for protection of the capacitor itself so as to avoid low level oscillations described previously. A voltage grading resistor 22, that may be nonlinear in accordance with known practice, is connected across the spark gap 20. Also, in the first circuit branch is a mechanical switch 46 that is in the normally closed position as shown.

The second current branch 16 includes a means 24, such as another spark gap (or series of gaps), for bypassing the equipment at a second predetermined over-voltage level higher than the first predetermined over-voltage level. The spark gap 24 may be of similar construction to the first but merely is adjusted or designed for a higher breakdown voltage and also has a voltage grading resistor 26 connected across it. The protection level of the second gap 24 is chosen for protection of the capacitor 10.

A center tapped reactor 28, for current limiting, is connected entirely in series with the second circuit branch 16 with the first circuit branch 14 connected to its center tap 30. Each circuit branch 14 and 16 has respective capacitors 32 and 34 in series with the spark gaps 20 and 24 for facilitating the triggering and build-up of voltage across the second branch after the first branch is conductive. Resistors 36 and 38 are respectively connected across the trigger capacitors 32 and 34.

The third circuit branch 18 includes a main spark gap 40. The main spark gap has a higher breakover value than either of the spark gaps 20 and 24 of the first or second circuit branches. A typical relation of the spark gaps would be that in the first circuit branch 14 spark-over would occur at about 2.5 times the normal or rated capacitor 10 voltage level. The gap of the second circuit branch 16 would be adjusted to a sparkover level of about 3.5 times the normal voltage and the main gap would sparkover at about 4 times the normal voltage. In the third circuit branch 18 one of the conductors to the main gap has on it a current transformer 42 which is associated through a timer and switch control 44, that may include electrical and pneumatic elements, and a mechanical linkage 45 to a switch 46 in the first circuit branch.

In normal operation the mechanical switch 46 in the first circuit branch is closed and the first spark gap is set to a low protective level. When a surge travels down the line a voltage will build up across the capacitor 10 and will sparkover the first spark gap 20. A voltage will then build up across the spark gap 24 of the second circuit branch in cascade fashion due to the cooperative relationship of the trigger capacitor 32 and main capacitor 10. After the initiation of sparkover of the first gap there is very rapid build-up to the sparkover level of the second. The voltage then doubles across the main gap 40, due to capacitors 32 and 34, to force it to spark-over. This system therefore provides protection at 2.5 times the rated voltage and yet all of the various spark gaps can be operable within a period of about 30 to 40 microseconds and results in a negligible time lag between the voltage sensing and protection functions as far as increased voltage across the bank is concerned.

As soon as the main gap 40 of the third branch is conductive, the current transformer 42, through the control circuit 44 and linkage 45, will open the switch 46 in the first current branch such as within three cycles. This disables branch 14 and raises the protective level so as to insure reinsertion and to allow swing currents to occur on the line without sparking-over until the level of sparkover of the second branch is reached. Sparkover during this mode occurs only if voltage reaches such a level as to damage the capacitor 10. At some later predetermined time the control 44 will cause the switch to be closed and return the protective system to its normal low protective level. This time could be adjusted from a fraction of a second to several seconds depending on the likelihood of the referred to swing currents occurring on the line.

Current transformer 42 can also be used to initiate an air blast to extinguish the arc of gap 40, as in prior practice.

Additional apparatus could be combined with that shown such as an additional circuit branch across the capacitor 10 that contains a mechanical bypass switch that would be to provide a means for inspection or maintenance of the capacitor 10. Also, an additional capacitor 48 is connected across the second spark gap 24 and its associated resistor where desirable for the purpose of suppressing a prematurely induced spark-over of spark gap 24 at the instant spark gap 20 sparks over. Capacitor 48 is connected from a point midway between the capacitor and spark gap of the second branch and control cabinet ground 50. The following table represents typical suitable values for the various components in accordance with an embodiment of the present invention.

| Capacitor | 32 | 0.2 | microf. |
| Resistor | 36 | 50 | kohms. |
| Capacitor | 34 | 0.04 | microf. |
| Resistor | 38 | 220 | kohms. |
| Capacitor | 48 | 0.002 | microf. |
| Gap | 20 | 25 Kv | (peak) |
| Gap | 24 | 35 Kv | (peak) |
| Gap | 40 | 40 Kv | (peak) |

The particular choice of switch 46, its actuation equipment 44, 45 and relation to the current transformer 42 may be in accordance with known practice such as that described in the referred to patent U.S. Pat. No. 3,801,870 or otherwise in accordance with known power switching and control technology.

I claim:

1. Protective apparatus for electrical equipment comprising: first, second, and third circuit branches connected electrically in parallel across the equipment to be protected;

said first circuit branch including means for bypassing the equipment at a first predetermined over-voltage level;

said second circuit branch including means for bypassing the equipment at a second predetermined over-voltage level higher than said first predetermined over-voltage level;

said third circuit branch including means for bypassing the equipment at a third overvoltage level higher than said second overvoltage level;

voltage cascading means for causing said second and third circuit branches to have their bypassing means operate upon the occurrence of an overvoltage effective to cause operation of the bypass of said first circuit branch;

means for disabling said first circuit branch upon the occurrence of the bypass through the third circuit branch and for restoring said first circuit branch to its original operating condition at a predetermined time after it is disabled.

2. The protective apparatus of claim 1 wherein: said first, second and third circuit branches contain spark gaps of successively higher sparkover level and said means for disabling and restoring comprises a mechanical switch in series with the spark gap of said first circuit branch and a current transformer is associated with said spark gap of said third circuit branch for initiating electrical signals to cause the opening and reclosing of said switch.

3. The protective apparatus of claim 2 wherein: capacitive means is provided connected across said spark gap of said second circuit branch for preventing premature sparkover of said second branch gap.

4. Series capacitor equipment comprising: a main capacitor connected in series in an alternating current transmission line; a first circuit branch connected across said main capacitor and including a first trigger spark gap having a first predetermined overvoltage level to produce sparkover; a second circuit branch connected across said main capacitor and including a second trigger spark gap having a second predetermined overvoltage level to produce sparkover higher than said first predetermined overvoltage level; a third circuit branch connected across said main capacitor and including a main spark gap; means for disabling said first circuit branch upon the occurrence of a sparkover of said main spark gap and for restoring said first circuit branch to its original operating condition at a predetermined time after it is disabled.

5. Series capacitor equipment in accordance with claim 4 wherein: said second trigger spark gap sparks over at a voltage selected to be sufficiently low to protect said main capacitor from damage due to overvoltages.

6. Series capacitor equipment in accordance with claim 5 wherein said first trigger spark gap sparks over at a voltage selected to be low enough to avoid oscillations on the transmission line that are potentially harmful to generating equipment connected thereto while being harmless to said main capacitor.

* * * * *